US007899895B2

(12) United States Patent
Bish et al.

(10) Patent No.: US 7,899,895 B2
(45) Date of Patent: Mar. 1, 2011

(54) TRANSFER OF OWNERSHIP OF A STORAGE OBJECT IN RESPONSE TO AN ORIGINAL OWNER NODE BECOMING AVAILABLE AFTER A PERIOD OF UNAVAILABILITY

(75) Inventors: Thomas William Bish, Tucson, AZ (US); Jonathan Wayne Peake, Tucson, AZ (US); Mark Albert Reid, Tucson, AZ (US); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 11/847,255

(22) Filed: Aug. 29, 2007

(65) Prior Publication Data
US 2009/0063668 A1    Mar. 5, 2009

(51) Int. Cl.
    G06F 15/173    (2006.01)
(52) U.S. Cl. .................. 709/223; 709/224; 709/225; 709/226; 707/704; 707/687; 714/4; 714/13
(58) Field of Classification Search ............... 709/223
    See application file for complete search history.

(56) References Cited
U.S. PATENT DOCUMENTS
5,826,265 A    10/1998    Van Huben et al.
(Continued)

FOREIGN PATENT DOCUMENTS
WO    98/03912    1/1998
WO    2005/045644    5/2005

OTHER PUBLICATIONS

U.S. Patent Application entitled "Propagation of Updates for Attributes of a Storage Object from an Owner Node of the Storage Object to Other Nodes", Serial No. unknown, filing date Aug. 31, 2007, IBM, by inventors T.W. Bish, M.A. Reid, J.M. Swingler and M.W. Young.

(Continued)

Primary Examiner—Thu Nguyen
Assistant Examiner—Neeraj Utreja
(74) Attorney, Agent, or Firm—Rabindranath Dutta; Konrad Raynes & Victor LLP

(57) ABSTRACT

Provided are a method, system, and article of manufacture, wherein a plurality of nodes coupled over a network are maintained, wherein a first node of the plurality of nodes initially owns a plurality of storage objects accessible via the network. A second node preemptively takes ownership of a selected storage object of the plurality of storage objects, in response to the first node becoming unavailable, wherein other nodes of the plurality of nodes can request ownership of the selected storage object while the first node is unavailable. A determination is made that the first node that originally owned the selected storage object has become available after a period of unavailability. A determination is made of the current owner node of the selected storage object, wherein the current owner node is one of the second node and the other nodes. The selected storage object is updated at the first node by the current owner node of the selected storage object, prior to allowing the first node to act on or assume ownership of the selected storage object.

20 Claims, 10 Drawing Sheets

U.S. PATENT DOCUMENTS

| | | | |
|---|---|---|---|
| 5,909,553 | A | 6/1999 | Campbell et al. |
| 6,292,905 | B1* | 9/2001 | Wallach et al. ............... 709/239 |
| 6,574,654 | B1 | 6/2003 | Simmons et al. |
| 6,618,744 | B1 | 9/2003 | Simmons et al. |
| 6,668,295 | B1 | 12/2003 | Chan |
| 6,708,198 | B1 | 3/2004 | Simmons et al. |
| 6,775,673 | B2 | 8/2004 | Mahalingam et al. |
| 7,085,897 | B2 | 8/2006 | Blake et al. |
| 2002/0099577 | A1* | 7/2002 | Black ............................ 705/7 |
| 2003/0065782 | A1 | 4/2003 | Nishanov et al. |
| 2005/0021573 | A1* | 1/2005 | McDermott et al. ......... 707/204 |

OTHER PUBLICATIONS

U.S. Patent Application entitled "Securing Transfer of Ownership of a Storage Object from an Unavailable Owner Node to Another Node", Serial No. unknown, filing date Aug. 31, 2007, IBM, by inventors T.W. Bish, T. Niranjan, M.A. Reid, J.M. Swingler, and M.W. Young.

O. Schoenborn, "Strict Ownership, STL Containers, & the NoPtr Library", C/C++ Users Journal, vol. 22, No. 5, May 2004, pp. 40-43.

* cited by examiner

TRANSFER OF OWNERSHIP OF A STORAGE OBJECT IN RESPONSE TO AN ORIGINAL OWNER NODE BECOMING AVAILABLE AFTER A PERIOD OF UNAVAILABILITY

BACKGROUND

1. Field

The disclosure relates to a method, system, and article of manufacture for securing the transfer of ownership of a storage object in response to an original owner node becoming available after a period of unavailability.

2. Background

In a distributed storage system, a plurality of distributed nodes, such as distributed computational devices, may have access to a plurality of logical storage volumes, wherein the logical storage volumes are logical representations of physical storage volumes that may store data and metadata. The plurality of logical storage volumes may be distributed across the plurality of distributed nodes and may be shared among some or all of the plurality of distributed nodes. Some or all of the nodes of the plurality of distributed nodes may be able to access, read, write, and perform other operations on the shared logical storage volumes.

The logical storage volumes may also be referred to as storage objects, wherein the storage objects may be shared among some or all of the plurality of distributed nodes of the distributed storage system. Storage objects may also comprise other units of data representations besides logical storage volumes.

SUMMARY OF THE PREFERRED EMBODIMENTS

Provided are a method, system, and article of manufacture, wherein a plurality of nodes coupled over a network are maintained, wherein a first node of the plurality of nodes initially owns a plurality of storage objects accessible via the network. A second node preemptively takes ownership of a selected storage object of the plurality of storage objects, in response to the first node becoming unavailable, wherein other nodes of the plurality of nodes can request ownership of the selected storage object while the first node is unavailable. A determination is made that the first node that originally owned the selected storage object has become available after a period of unavailability. A determination is made of the current owner node of the selected storage object, wherein the current owner node is one of the second node and the other nodes. The selected storage object is updated at the first node by the current owner node of the selected storage object, prior to allowing the first node to act on or assume ownership of the selected storage object.

In certain additional embodiments, it is determined whether the current owner node has a higher ownership validity level for the selected storage object than the first node. Ownership of the selected storage object is transferred to the first node if the current owner node does not have a higher ownership validity level for the selected storage object than the first node.

In further embodiments, the updating of the selected storage object comprises determining, by the current owner node, whether any update is pending from a peer node on the selected storage object, and executing, by the current owner node, the pending update on the selected storage object, prior to allowing the first node to assume ownership of the selected storage object, wherein an error state can result if at least some of the pluralities of nodes modify data in the selected storage object at the same time.

In yet further embodiments, wherein when ownership of the selected storage object is transferred to a selected node, the selected node sends the following information to all available nodes: (i) identity of the first node that originally owned the selected storage object; (ii) identity of the selected node that currently owns the selected storage object; (iii) a takeover type of the selected storage object, wherein the takeover type indicates whether the selected storage object can be both read from and written to or whether the selected storage object is read only; and (iv) a transfer version that is used to validate a latest owner node in response to ownership of the selected storage object being transferred a plurality of times.

In additional embodiments, for each node a local version of attributes of the selected storage object is maintained, wherein the local version of the attributes of the selected storage object includes: (i) identity of the first node that originally owned the selected storage object; (ii) identity of the selected node that owns the selected storage object; (iii) a takeover type of the selected storage object, wherein the takeover type indicates whether the selected storage object can be both read from and written to or whether the selected storage object is read only; and (iv) a transfer version that is used to validate a latest owner node in response to ownership of the selected storage object being transferred a plurality of times.

BRIEF DESCRIPTION OF THE DRAWINGS

Referring now to the drawings in which like reference numbers represent corresponding parts throughout.

DETAILED DESCRIPTION

Figure 1:
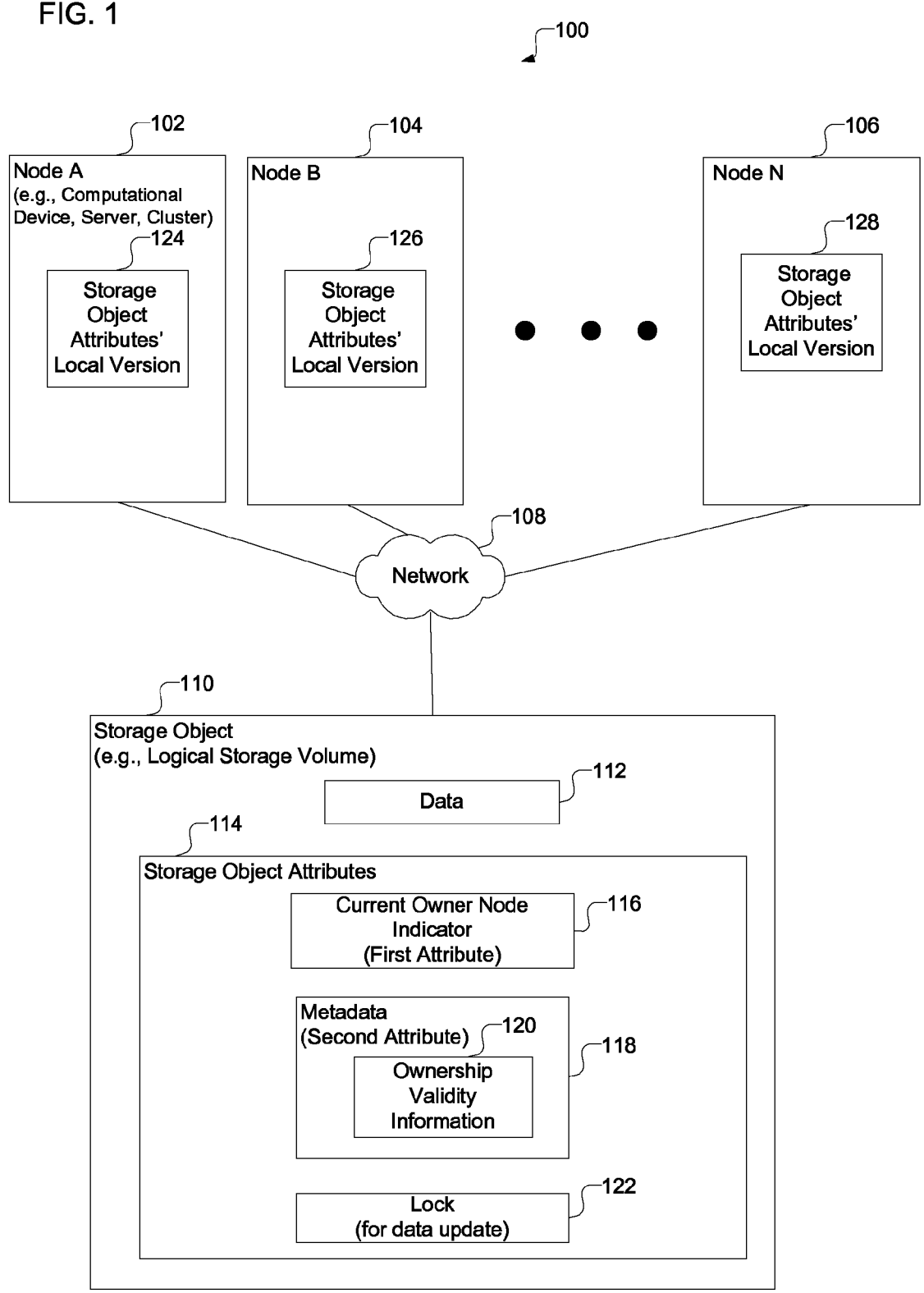
FIG. 1 illustrates a block diagram of a computing environment that includes a plurality of nodes, in accordance with certain embodiments.

In the following description, reference is made to the accompanying drawings which form a part hereof and which illustrate several embodiments. It is understood that other embodiments may be utilized and structural and operational changes may be made.

Ownership Protocol in a Composite Storage Server

In a composite storage server in which a plurality of distributed sites have equal access to a plurality of logical storage volumes, mechanisms may be provided to atomically manage the usage of the shared logical storage volumes. The equal access to a logical storage volume may be initiated by a site's internal mechanisms or by requests issued directly to a distributed site. One distributed site may be guaranteed exclusive access to one particular storage volume within the composite storage server. In addition, each distributed site within the composite library may have the ability to depend on this exclusive distributed site for the most consistent view of the composite storage server with respect to the storage volume exclusively accessed by the exclusive distributed site. Furthermore, this exclusive right to the storage volume may cause the privileged distributed site to execute commands on behalf of the peers of the privileged distributed site when non-exclusive commands co-exist with protected commands.

In certain situations only one distributed site within the composite storage server can have exclusive ownership of a storage volume at any given time. The ownership carries with it responsibilities and privileges with regards to the owned storage volume. The ownership can be explicitly surrendered or passed on to a distributed peer node using an ownership exchange process. The current owner node of a storage volume may have ultimate authority on: (a) any consistency associated with the storage volume; (b) associated properties of the storage volume; and, (c) any external entities directly mapped to the storage volume. The owner node also has the ability to invalidate or synchronize the owned storage volume at peer distributed sites when needed. Furthermore, an ownership protocol may use an appropriate update mechanism to ensure there are no race conditions during ownership exchanges.

Each distributed site may have a token or object which is used to store both local and composite properties associated with a particular storage volume. This token includes information on the current owner within the composite storage server. In addition, the ownership may be tracked with an additional ownership version property also referred to as an ownership validity indicator. The version property may be increased with each ownership exchange and synchronized among all distributed sites within the composite storage server. The current owner is responsible for updating the current owner and the ownership version value within each distributed site's token. When ownership is in question, the site with the largest value of the ownership version determines which distributed site is the current owner.

The ownership protocol may also allow the marking of a storage volume as busy. Ownership alone does not provide exclusive access to a storage volume's contents and/or properties without first reserving the storage volume, particularly in situations in which multiple processes have equal access to the same storage volume within a single distributed site. Therefore, once ownership is obtained or verified, the token is moved to a reserved state. Once the operation has completed, the token can be unlocked. Ownership will remain at the distributed site until a neighboring distributed peer explicitly requests ownership transfer. If an ownership request occurs during the busy state, the ownership request will be denied with a busy or in-use response.

In addition, a storage volume may have associated processes or functions that can be run against the storage volume, wherein the processes or functions can be executed in parallel to the exclusively protected commands. Since ownership cannot be transferred during execution of exclusively protected commands, the processes or functions are forwarded to the current owner node of the storage volume. The current owner node of the storage volume may then execute the command on behalf of one of the peers of the current owner node. Any updates which may result are controlled by the owner node and only when the exclusive access and all parallel forwarded operation have completed will the storage volume ownership be in a state in which ownership transfer is permitted.

Ownership Takeover

The ownership protocol described above may work well when the owner node is always available. The protocol may break down when the owner node becomes unavailable. Certain embodiments provide implementations for ownership takeover when the owner node is unavailable. This may be first performed by providing permission to take over ownership via any of the following mechanisms:

1. First mechanism: Ownership takeover can be performed via explicit user request. For example, a person may walk up to a configuration panel and explicitly provide the remaining nodes permission to take over ownership from the unavailable node;

2. Second Mechanism: The unavailable node may intentionally became unavailable because of service requirements (e.g., for maintenance), and therefore automatic takeover permission may be implied.

3. Third Mechanism: An optional and configurable background autonomic takeover protocol may determine that the unavailable node is actually unavailable and the unavailability has not simply been caused by a communication failure. The third mechanism provides a takeover mechanism similar to the ownership takeover via explicit user request (as described in the first mechanism).

For the above mechanisms, there may be three modes of takeover:

1. Read/Write (R/W)—This mode is enabled either by the first or third mechanism if configured to do so. In the R/W mode, once the storage object is taken over, the existing nodes can read/write to the object and the properties of the object.

2. Read Only (R/O)—The R/O mode is enabled either by the first or third mechanism if configured to do so. Once a storage object is taken over, the existing nodes can only read the storage object and the associated properties of the storage object. Any write attempt to the storage object will fail.

3. Read/Write Service—Th "R/W service" mode is similar to the R/W mode except for the fact that the "R/W service" mode is automatically enabled through the intentional service entrance of the second mechanism.

Once a method and a mode is enabled, existing nodes will view that their owner values and validity information points to the current owner which is the unavailable node. At this time, existing nodes have to arbitrate for a special token or empty storage object to serialize takeover from the unavailable node. For purposes of illustration, let us call the special token $ST_x$ where x is the index of the unavailable node. Once $ST_x$ is owned and locked down, the owner of the $ST_x$ lock can preemptively update its local ownership information and validity information to claim the storage objects of the unavailable node as the owner. The owner of the $ST_x$ lock then updates all peer nodes to agree. The $ST_x$ locks prevents two available nodes from taking over the ownership at the same time. The $ST_x$ lock can also be taken over if the $ST_x$ lock is currently owned by an unavailable cluster which allows for takeover.

For further illustration, the original owner node is referred to the "v-node" and the new owner node is referred to as the "r-node". The r-node now is the new owner. The ownership can then be transferred from the r-node to another available node if requested. Therefore, for purposes of illustration:

v-node—Old owner;

r-node—Node that took over the volume; and

New Owner—Node that currently owns the volume (the new owner is initially equal to r-node at time of takeover).

Before a r-node can takeover the volume, the r-node validates the view of the data object seen by the r-node. The r-node determines whether the r-node's meta-data is consistent or inconsistent. The r-node determines that the r-node's view of the data contents is consistent if the takeover operation requires consistent data (i.e. reading the data vs. write from the beginning). The consistent data may not reside within the r-node, but within one of the other available nodes. The r-node may have consistent meta-data pointing to the consistent data.

Once the volume is taken over, the r-node stores the following information about the volume at the time of the takeover:

1. What validity level existed at the time of the takeover;
2. What data consistency level existed at the time of the takeover; and
3. What properties consistency level existed at the time of the takeover.

In addition to storing the above values, the r-node is responsible for informing all other peers about the takeover. This informing of the takeover may be referred to as "awareness". The awareness of the takeover is saved within the token and each node may then be aware of the v-node, the r-node and the type of takeover (i.e. R/W, R/O, R/W-Service).

When the v-node rejoins the configuration or becomes available, the r-node may make the v-node aware of the takeover through reconciliation. The reconciliation may be preformed in accordance with the following operations:

1. Invalidate the v-node so as to prevent the v-node from thinking that the v-node is the owner.
2. View the v-node's owner validity, data consistency level and properties level.
   a. If the v-node wasn't really the owner, move to error state.
   b. If the v-node also wrote to the data object and the r-node or others did as well, then move the data object into an error state.
   c. If the v-node wrote to the data object and the r-node or others only read the information and the v-node has a higher owner validity level, then return ownership to the v-node.
   d. If the v-node did not write to the data object and the r-node or others either read or wrote to the object, maintain the new owner and update the v-node's ownership validity information to agree.
3. Once the v-node is aware and all other nodes are aware, the r-node may clear all history of the takeover. If nodes are unavailable or not aware, the takeover awareness information must remain in the r-node until all nodes are educated or aware. Only then can the takeover awareness information be cleared.

The r-node which is the only node that can reconcile the takeover may be requested to be put into service (i.e., taken off-line) before the v-node becomes available. At this time, the r-node must surrender the role of the r-node to another available educated/aware node. The new r-node may then save the same information the original r-node saved while also incrementing a "r-node transfer" version. This increased version is used to validate the latest r-node cluster in the event transfers are made multiple times. The latest r-node is then responsible for educating all nodes of the new version information and awareness. The latest r-node will also reconcile the v-node and clear the takeover history.

Once the unavailable or v-node cluster becomes available, the takeover modes are all automatically disabled and normal ownership protocol ownership requests initiated. No further takeovers take place. If the new owner becomes unavailable and the r-node has not yet cleared the takeover across all nodes, then a second takeover is not allowed.

Ownership Takeover Detection

In certain embodiments, the v-node becomes available once again and the v-node should have the ability to detect that that the v-node was a target of certain data objects being taken over. It is not desirable for the v-node to assume that the v-node is the owner and attempt to modify the data object. Certain embodiments prevent any race where a v-node can modify the storage objects of the v-node before becoming aware of the takeover.

In certain embodiments, the information that the r-node informs all nodes with comprises identification of the v-node, identification of the r-node, a r-node transfer version, and a takeover type, and the information is saved within each node's token.

When any node attempts to join the domain or group of nodes/clusters, the node first performs a pending updates merge with all the peers of the node. This is to allow all peers to perform a "bulk merge" awareness of all takeovers onto the potential v-node. Those storage objects which may have been taken over while down may be marked as "takeover possible". Once all storage objects are bulk updated, any storage objects that were taken over are now not legally owned by the joining node. The joining node may then request the r-node to reconcile the token of the v-node in the event that the v-node attempts to access the data object. In addition, the r-node may aggressively reconcile all v-node storage objects serially, but customer driven access to the storage object may demand that the storage object be reconciled early.

Making all nodes aware of the takeover allows all nodes to inform the v-node of a takeover. This is true even if the r-node or current owner is no longer available. Only one aware cluster is needed in order to educate the v-node of the potential takeover. Once informed, a node will not view itself as the owner until the node is reconciled and made aware.

This requirement to block and wait for the bulk merge phase with all peers is true for all nodes. All nodes must be merged with. If the joining node cannot communicate with other nodes, then the joining will remain blocked since the unavailable nodes may be r-nodes and did not have the opportunity to make the takeover aware to the remaining nodes. Only when a joining node merges with all other peers can the joining node come online. There is an exception, when a node goes into service and another node is also in service. So long that a third party node witnessed both nodes enter service and it remained up, the third party node can assume that the second node in service could not be a r-node and therefore the joining cluster can be brought online without merging with the second service cluster.

This blocking may be viewed as unacceptable or not valid in a case where another peer has been down for an extended time or is down permanently. In this case, the joining node is blocked and cannot come online. There is then provided a method to preemptively move the node online which gives the node permission to skip the merge phase with only those nodes it cannot communicate with. This preemptive move method is driven by the user of the product since the user may know the history of the outages. For example, the unavailable node may be available and modifying preemptively transferred volumes and only a network outage exists. In this case, it is not desirable for the customer to issue a preemptive move. Only when the unavailable node has been down the entire time or longer than the joining node should a preemptive move be allowed.

During the preemptive move, certain embodiments may validate through peers, through third party network configurations or other methods to see if a network outage is the cause. If so, the preemptive move is denied. Also, a r-node may leave other domain wide persistent information present in the domain to inform the v-node that the v-node may be a v-node of one or more storage objects. In such cases, a preemptive move is not allowed.

Exemplary Embodiments

FIG. 1 illustrates a block diagram of a computing environment 100 that includes a plurality of nodes 102, 104, 106 that are coupled via a network 108, in accordance with certain embodiments. While FIG. 1 shows three nodes, node A 102, node B 104, and node N 106, in alternative embodiments a different number of nodes may be coupled via the network 108.

The nodes 102, 104, 106 may comprise any suitable computational platform, including those presently known in the art, such as, a server, a personal computer, a workstation, a mainframe, a midrange computer, a network appliance, a palm top computer, a telephony device, a blade computer, a hand held computer, etc. Each of the nodes 102, 104, 106 may also represent a cluster, i.e., a collection of nodes.

A storage object 110, such as a logical storage volume, may be shared among some or all of the plurality of nodes 102, 104, 106. The storage object 110 may reside in a storage device coupled to the network or may reside in any of the nodes 102, 104, 106 or may reside in some other element of the computing environment 100. While the storage object 110 is shown to represent a logical storage volume, in alternative embodiments the storage object 110 may represent any other unit of storage, such as a logical block, a segment, etc. While only one storage object 110 has been shown, a plurality of storage objects may be distributed in the computing environment 100, wherein the plurality of storage objects may be shared by the plurality of nodes 102, 104, 106.

Associated with the storage object 110 are the data 112 included in the storage object 110 and storage object attributes 114 corresponding to the storage object 110. The storage object attributes 114 include a current owner node indicator 116, metadata 118 that includes ownership validity information 120, and a lock 122 for data update. The current owner node indicator 116 indicates which of the nodes included in the computing environment 100 is the current owner node of the storage object 110. The ownership validity information 118 may be used to resolve the validity of ownership of the storage object 110 among the plurality of nodes 102, 104, 106 of the computing environment 100. The lock 122 is a data structure that is required to be possessed by a node before the node can exclusively access the storage object 110. The nodes 102, 104, 106 may maintain local versions 124, 126, 128 of the attributes 114 of the storage object 110.

Therefore, FIG. 1 illustrates certain embodiments in which local versions 122, 126, 128 of attributes 114 of a storage object 110 are stored at a plurality of nodes 102, 104, 106, wherein a first attribute, referred to as a current owner node 116, designates a node of the plurality of nodes as an owner node for the storage object 110, and wherein a second attribute, referred to as metadata 118, includes information 120 to resolve the validity of ownership of the storage object 110 among the plurality of nodes. In further embodiments, each node of the plurality of nodes 102, 104, 106 comprises a cluster of a plurality of clusters 102, 104, 106, wherein the plurality of clusters 102, 104, 106 comprise a domain, and wherein the storage object 110 is a shared object for the plurality of clusters 102, 104, 106 of the domain, and wherein a stored object that is shared is a logical object that is physically stored on a device included in the domain.

Figure 2:
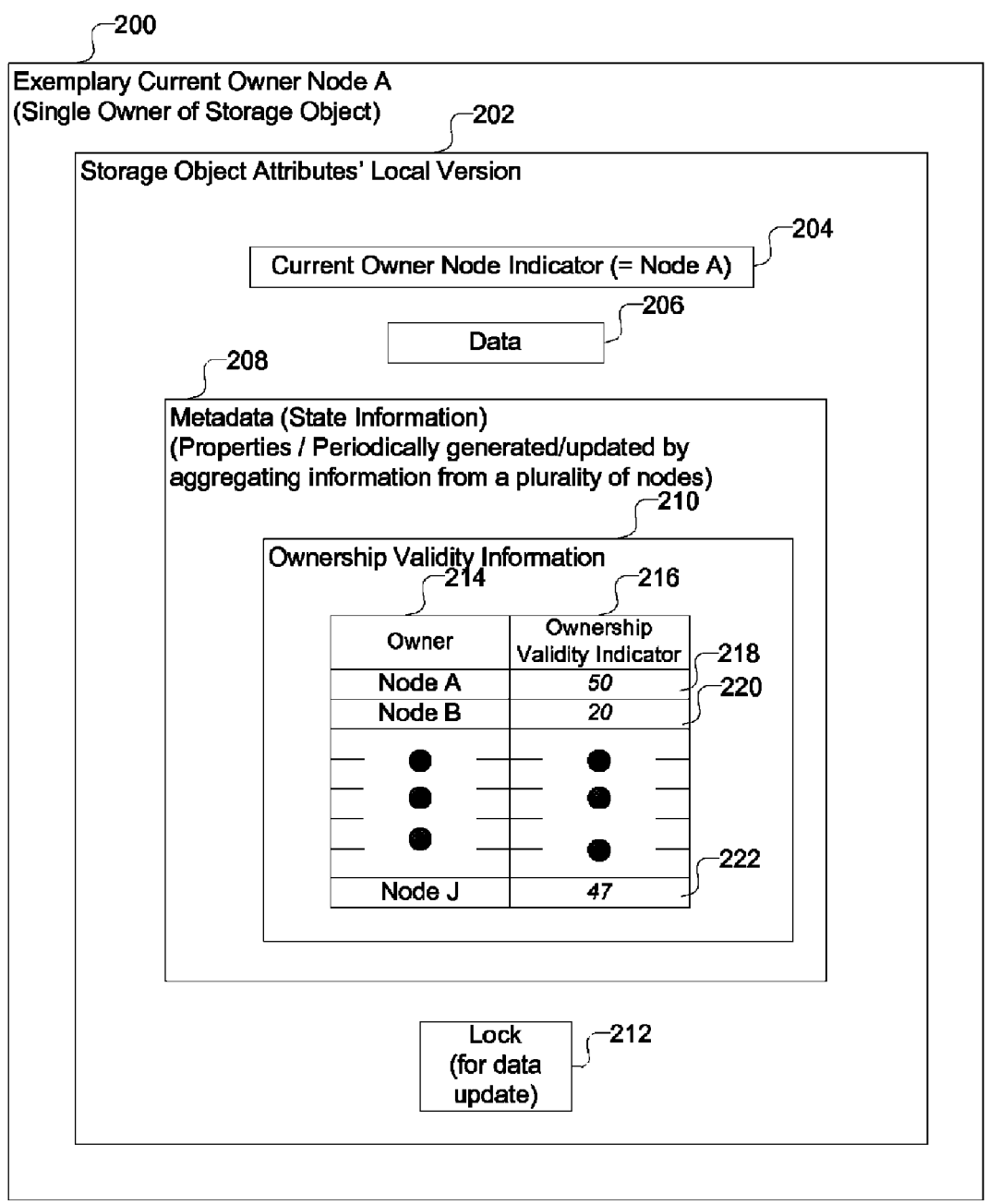
FIG. 2 illustrates a block diagram that shows data structures included in an exemplary current owner node, in accordance with certain embodiments.

FIG. 2 illustrates a block diagram that shows data structures included in an exemplary current owner node 200, in accordance with certain embodiments. While FIG. 2 shows that the current owner node is "Node A" (corresponding to node 102 of FIG. 1), in alternative embodiments the exemplary current owner node 200 may correspond to any of the nodes 102, 104, 106 of the computing environment 100 shown in FIG. 1. At any given time, the exemplary current owner node 200 may be the single owner of the storage object 110 shown in FIG. 1.

The storage object attributes' local version 200 (corresponds to storage object attributes' local version 124 of FIG. 1) associated with the exemplary current owner node 200 may include the current owner node indicator 204, the data 206 corresponding to the storage object currently owned by the exemplary current owner node 200, the metadata 208 including ownership validity information 210, and the lock 212.

The metadata 208 may be periodically generated and/or updated by aggregating information from the plurality of nodes 102, 104, 106 of the computing environment 100. The ownership validity information 210 may include for each of the potential owners 214 of the storage object 110 an ownership validity indicator 216. For example in the illustrative table representing the ownership validity information 210, row 218 shows that "Node A" has an ownership validity indicator with value 50, row 220 shows that "Node B" has an ownership validity indicator with value 20, and row 222 shows that "Node J" has an ownership validity indicator with value 47. In this particular exemplary embodiment, the current node indicator 204 shows that the current owner is "Node A" which also has the highest value for the ownership validity indicator 216. In certain embodiments, the ownership validity indicator 216 for a node may be used to determine whether to allow another node to inherit ownership of the storage object 110 once the owner node surrenders ownership of the storage object 110.

Figure 3:
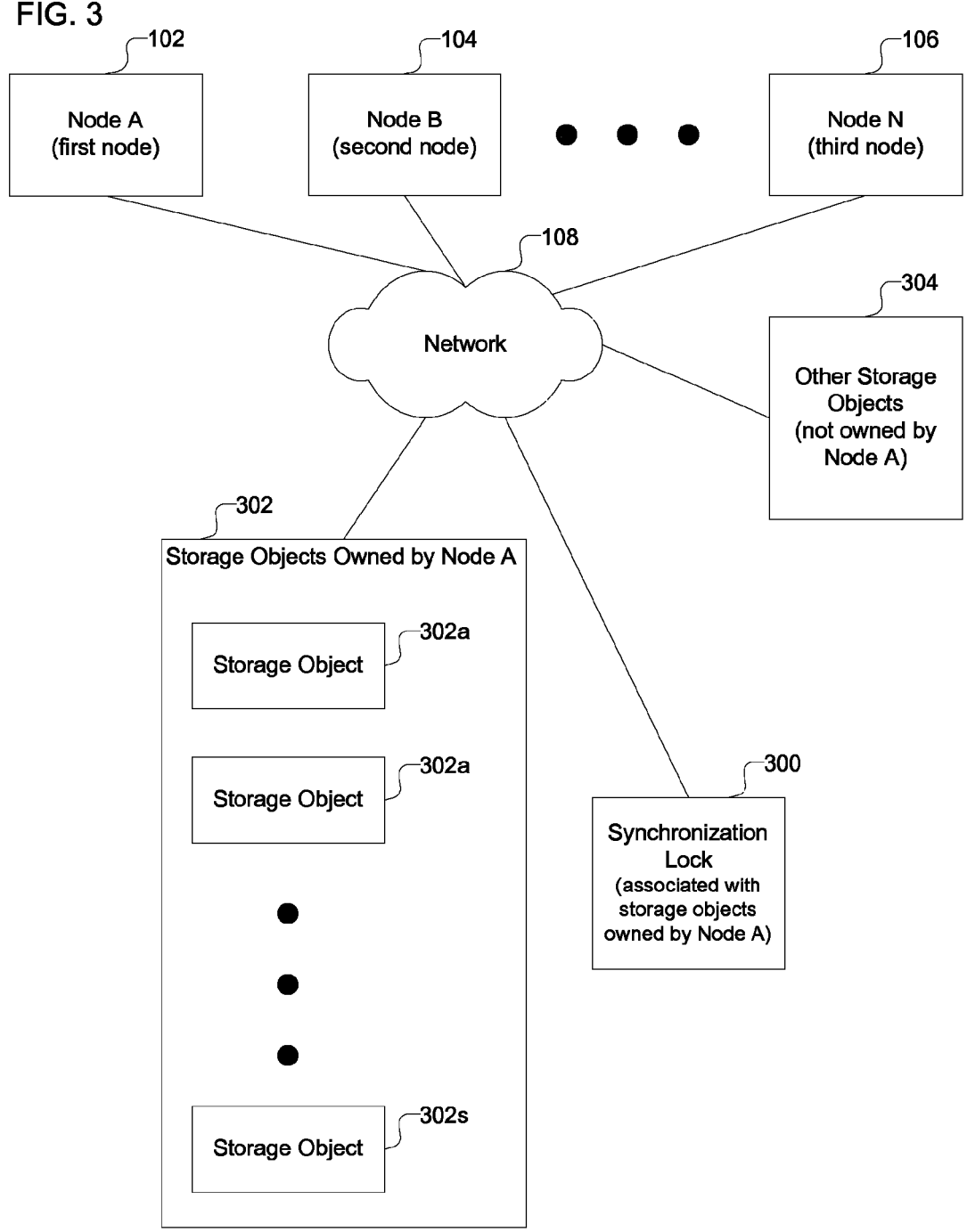
FIG. 3 illustrates a block diagram that shows how a synchronization lock is used, in accordance with certain embodiments.

FIG. 3 illustrates a block diagram that shows how a synchronization lock 300 is used in the computing environment 100, in accordance with certain embodiments. FIG. 3 shows storage objects 302, including exemplary storage objects 302a, 302b, . . . , 302s, owned by node A 102, and other storage objects 304 that are not owned by node A 102. The synchronization lock 300 is associated with the storage objects 302 owned by node A 102.

The synchronization lock 300 may have to be owned by another node, such as node B 104, before a preemptive transfer of ownership of one of more of the storage objects 302 can take place from node A 102 to node B 104, in the event that node A becomes unavailable. For example, if node A 102 became unavailable and node B wanted to preemptively take over ownership of some or all of the storage objects 302, then node B must take over ownership of the synchronization lock 300 before preemptively taking over ownership of some or all of the storage objects 302. As a result of the requirement to possess the synchronization lock 302 before takeover of ownership, race conditions that may occur when multiple nodes attempt to take over ownership of some or all of the storage objects are avoided.

Figure 4:
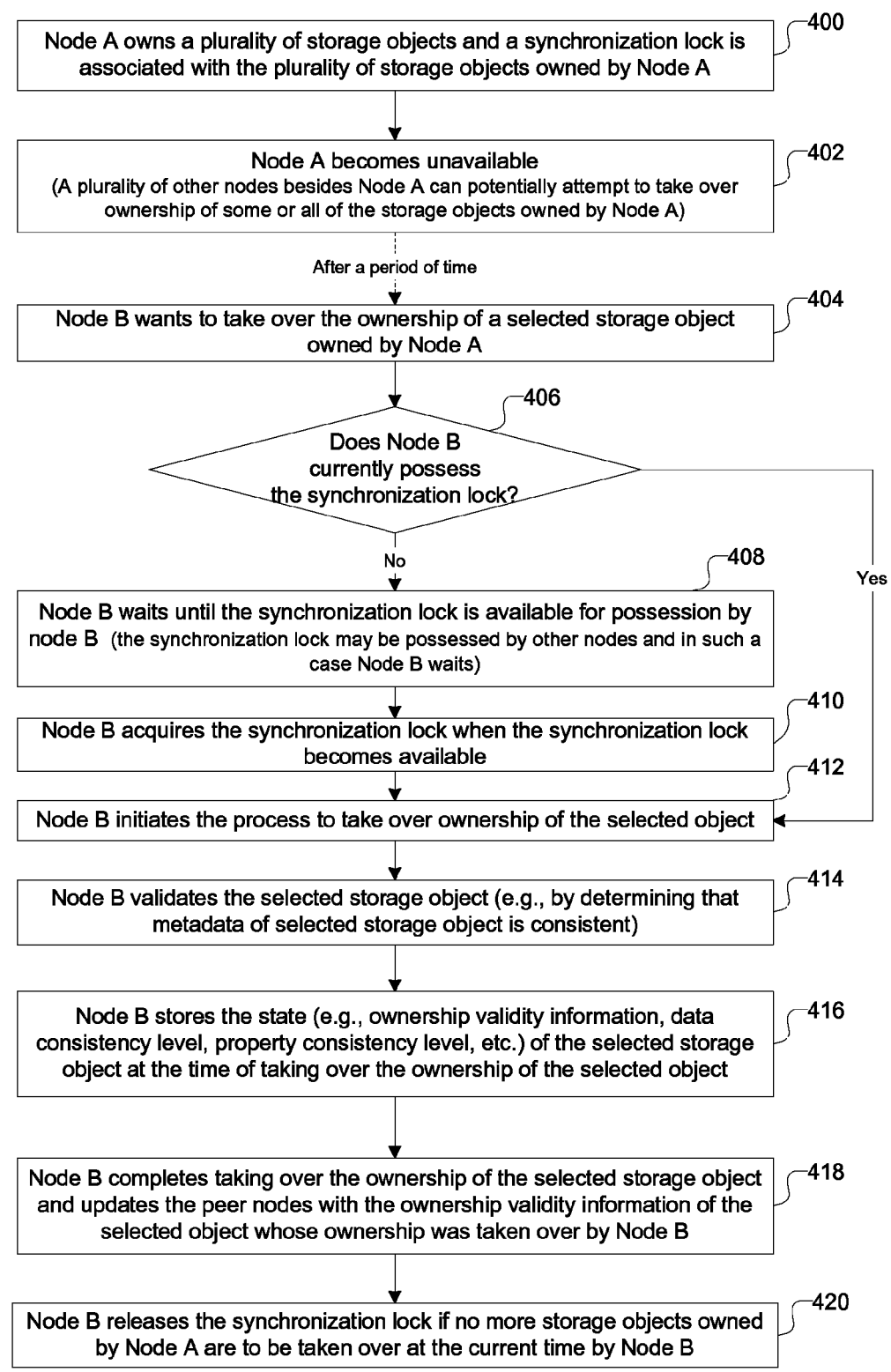
FIG. 4 illustrates first operations implemented in the computing environment, in accordance with certain embodiments.

FIG. 4 illustrates first operations implemented in the computing environment 100, in accordance with certain embodiments. The first operations may be performed by hardware, software, or firmware present on one or more of the nodes 102,104,106.

Control starts at block 400, where node A 102 owns a plurality of storage objects 302 and a synchronization lock 300 is associated with the plurality of storage objects 302 owned by node A 102. Control proceeds to block 402, where node A 102 becomes unavailable. A plurality of other nodes besides node A (which has become unavailable) can then potentially attempt to take over ownership of some or all of the storage objects 302 owned by node A 102.

After a period of time, node B 104 wants (at block 404) to take over the ownership of a selected storage object 302a owned by node A 102. Node B 104 may want to take over more storage objects or all storage objects owned by node A 102.

Control proceeds to block 406, where a determination is made as to whether node B 104 currently possesses the synchronization lock 300. If not, then node B 104 waits (at block 408) until the synchronization lock 300 is available for possession by node B 104. For example, the synchronization lock 300 may be possessed by other nodes and in such a case node B 104 waits for the synchronization lock 300.

Node B 104 acquires (at block 410) the synchronization lock 300 when the synchronization lock 300 becomes available, and node B 104 then initiates (at block 412) the process to take over ownership of the selected object 302a. Node B 104 then validates (at block 414) the selected storage object 302a (e.g., by determining that metadata of selected storage object is consistent).

Node B 104 stores (at block 416) the state (e.g., ownership validity information, data consistency level, property consistency level, etc.) of the selected storage object at the time of taking over the ownership of the selected object 102a. Node B 104 then completes (at block 418) the taking over the ownership of the selected storage object 302a and updates the peer nodes (e.g., Node N 106) with the ownership validity information of the selected object 302a whose ownership was taken over by Node B 104. Node B 104 then releases (at block 420) the synchronization lock 300 if no more storage objects owned by Node A 102 are to be taken over at the current time by Node B 104.

If at block 406 a determination is made that node B 104 currently possesses the synchronization lock 300 then control proceeds to block 412 where node B 104 initiates the process to take over the selected object 302a.

Node B 104 may store state information corresponding to the selected storage object 302a owned by node A 102. Node B 104 communicates ownership validity information of the selected storage object 302a to other nodes of the plurality of nodes. Node B 104 then releases the serialization lock 300 and other nodes are allowed to acquire ownership of the storage objects 302. The state information stored by node B 104 may comprise: (i) ownership validity information indicating which node was a valid owner of the selected storage object 302a at a time of taking over ownership of the selected storage object by node B 104; (ii) data version stored in the selected storage object 302a at the time of taking over ownership of the selected storage object 302a by node B; (iii) metadata about the data stored in the selected storage object 302a at the time of taking over ownership of the selected storage object by the second node.

Figure 5:
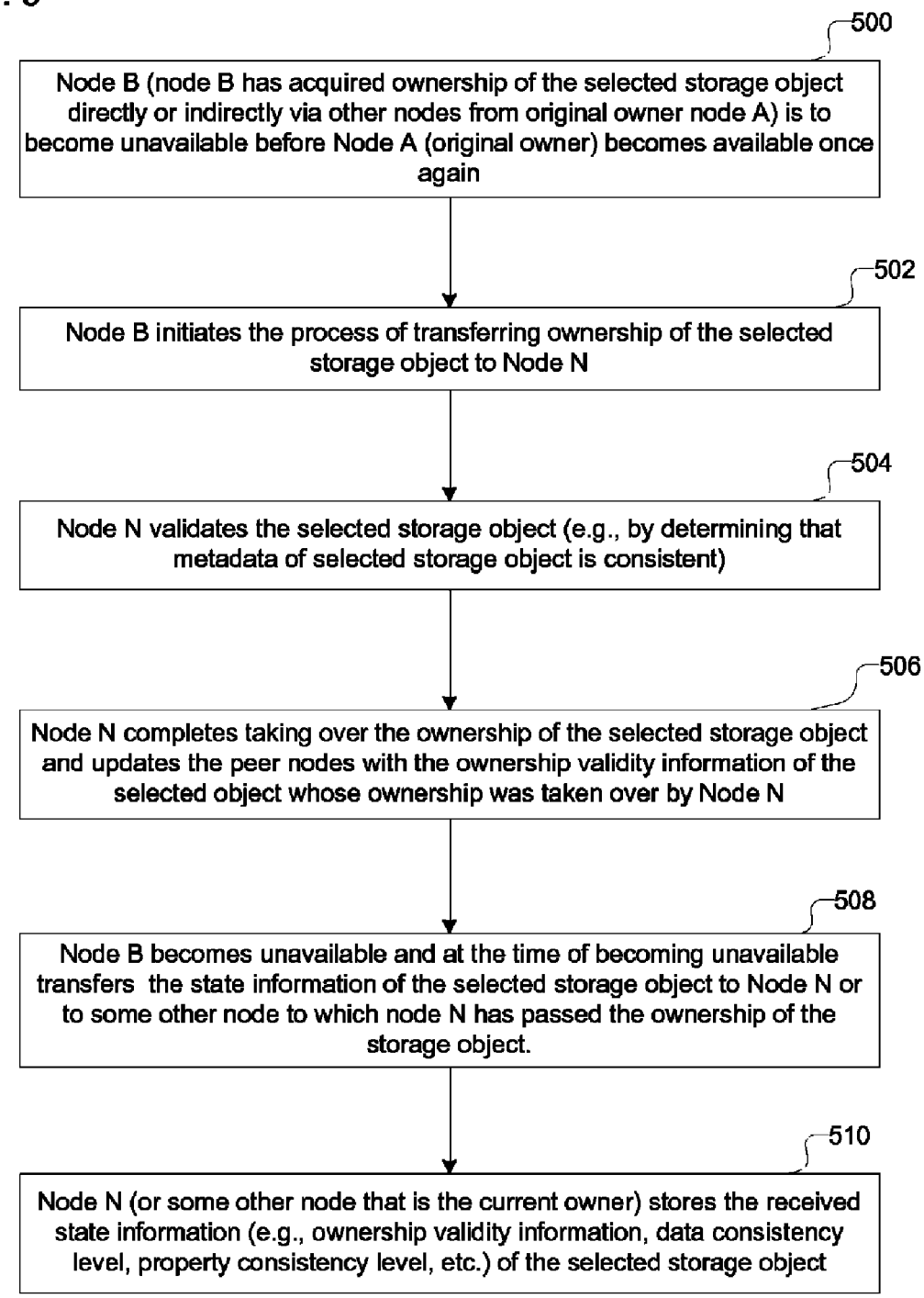
FIG. 5 illustrates second operations implemented in the computing environment, in accordance with certain embodiments.

FIG. 5 illustrates second operations implemented in the computing environment 100, in accordance with certain embodiments. The second operations may be performed by hardware, software, or firmware present on one or more of the nodes 102, 104,106. FIG. 5 shows the operations performed when a node that owns state information for a storage object whose ownership has been transferred to another node is to become unavailable. It is possible for a selected node to keep holding the state information for a storage object while the storage object is being transferred from node to node, as long as the selected node is available. However, if the selected node is to become unavailable then the state information of the storage object should be transferred to the current owner node, such that if the original owner node (e.g., node A 102) became available once again, the current owner node could provide the state information to the original owner node.

Control starts at block 500, where node B 104 that has acquired ownership of the selected storage object 302a directly or indirectly via other nodes or from original owner node A 102, is to become unavailable before node A 102 (original owner) becomes available once again.

Node B 104 initiates (at block 502) the process of transferring ownership of the selected storage object 302a to node N 106. Control proceeds to block 504, where node N 106 validates the selected storage object 302a (e.g., by determining that metadata of selected storage object 302a is consistent). Then, node N 106 completes (at block 506) taking over the ownership of the selected storage object 302a and updates the peer nodes with the ownership validity information of the selected object 302a whose ownership was taken over by Node N 106. Node N 106 now possess ownership of the selected object 302a without necessarily possessing the state information of the selected object 302a, wherein the state information of the selected object 302a is still with node B 104.

Once node N 106 has taken over the ownership of the selected storage object 302a and has then optionally passed on the ownership to other nodes, node B 104 becomes (at block 508) unavailable. At the time of becoming unavailable, node B 104 transfers the state information of the selected storage object 302a to node N 106 or in alternative embodiments to some other node to which ownership of the selected storage object 302a has passed. Node N 106 (or the current owner node) stores (at block 510) the received state information (e.g., ownership validity information, data consistency level, property consistency level, etc.) of the selected storage object 302a and may at a subsequent point in time provide the state information to the original owner node A 102 when the original owner node A becomes available.

Therefore, FIG. 5 illustrates how one or more selected storage objects and corresponding state information are transferred from one node to another when one node is to become unavailable before the original owner node of the one or more selected storage objects become available. In FIG. 5, the notion of node B 104 giving ownership to node N 106 while original owner node A 102 is still down is independent of the state information. The ownership can be transferred between node B 104 through to other nodes once the preemptive takeover has occurred. However, node B 104 still owns the state information. That state information can be transferred to node N 106 when node B is going to become unavailable. This allows node N 106 to update node A's 102 ownership information once node A 102 comes back, i.e., becomes available.

Figure 6:
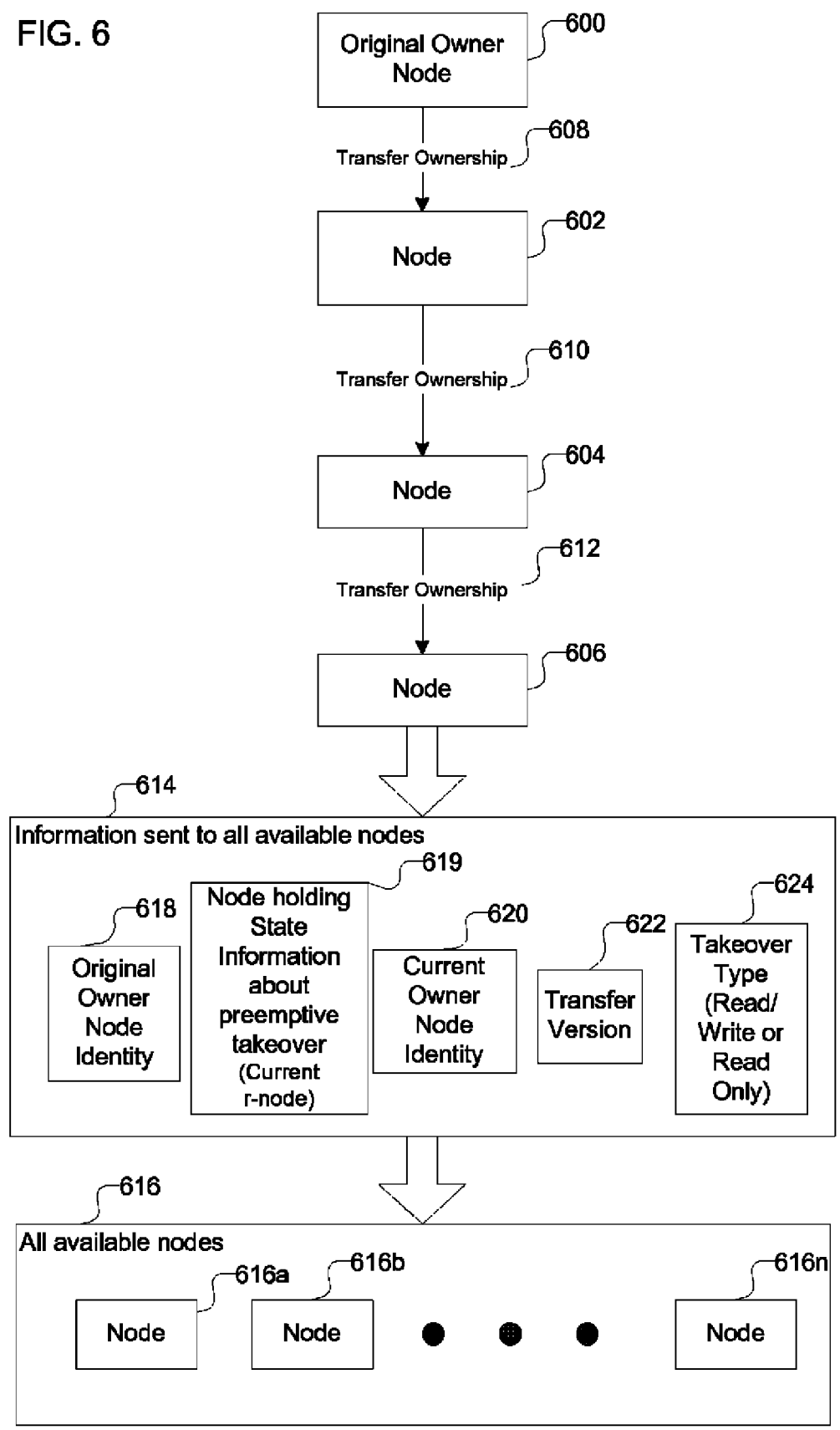
FIG. 6 illustrates transfer of information among a plurality of nodes, in accordance with certain embodiments.

FIG. 6 illustrates transfer of information among a plurality of nodes, wherein the plurality of nodes may be implemented in the computing environment 100, in accordance with certain embodiments. The nodes shown in FIG. 6 may include any of the nodes 102, 104, 106 or other nodes of the computing environment 100 shown in FIG. 1.

Ownership of a storage object has been transferred among nodes 600, 602, 604, 606 via ownership transfer processes 608, 610, 612, where node 600 was the original node for the storage object. When node 606 (or any other node) secures ownership of the storage object then node 606 sends the information 614 to all available nodes 616 of the network 108, wherein all available nodes 616 may includes the nodes 616*a*, 616*b*, ... 616*n*.

The information 614 sent to all available nodes include the identity 618 of the original owner node 600, the identity 619 of the node holding state information about the preemptive transfer, i.e., the current r-node, the identity 620 of the current owner node 606, a transfer version 622, and the takeover type 624, such as whether the takeover was R/W, R/O, etc. The transfer version 622 may be used to validate a latest owner node in response to ownership of the selected storage object being transferred a plurality of times. While in certain exemplary embodiments the terms v-node and r-node have not been used, for purposes of illustration the holder of the additional preemptive takeover data collected at the time of the preemptive takeover may be referred to as the r-node. The owner node is then the node that can act on the object (i.e., the owner node is the current owner among the plurality of nodes as the current owner keeps changing). However, the owner of the preemptive transfer data, i.e., state information about the preemptive transfer, is the one that reconciles the v-node. The owner of the preemptive takeover data can also move the "r-node role" to some other node. It should be noted that the r-node and current owner can be different nodes.

Therefore, FIG. 6 illustrates certain embodiments in which when ownership is transferred between nodes all available nodes are informed with the identities of the current owner node and the original owner node, and updated with the transfer version 622 and the ownership takeover type 624.

Figure 7:
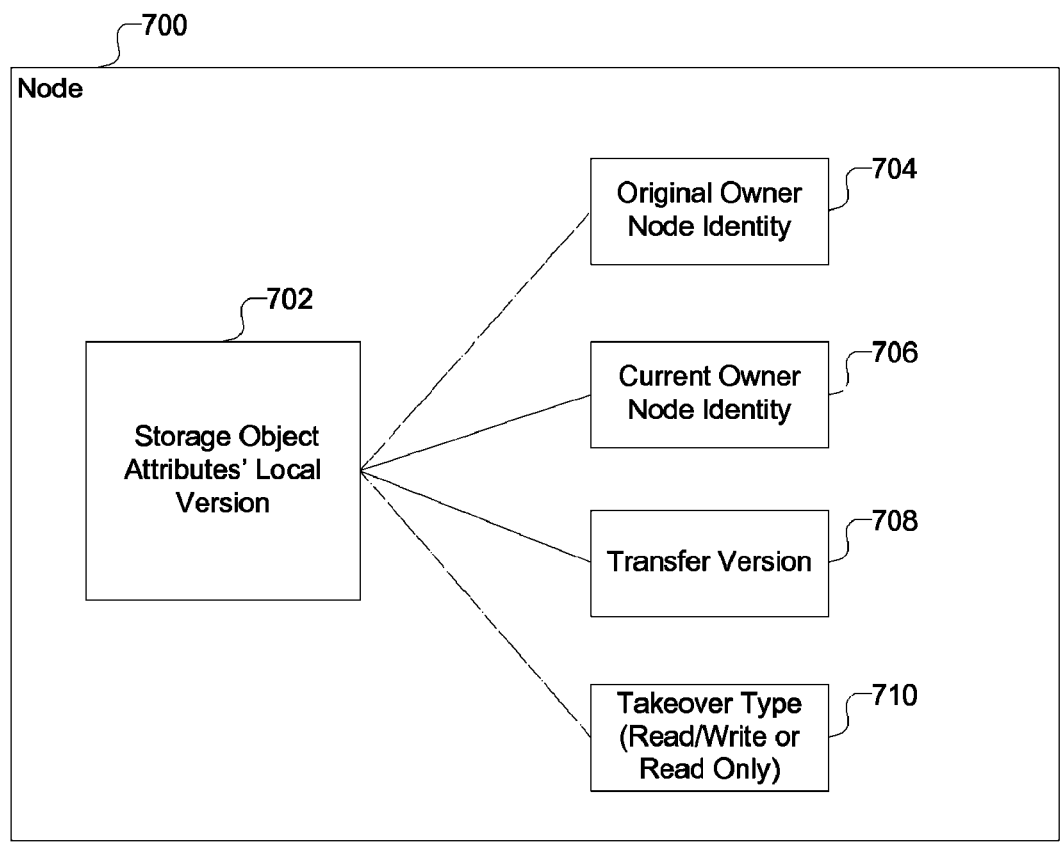
FIG. 7 illustrates local storage object attributes, in accordance with certain embodiments.

FIG. 7 illustrates local storage object attributes 702 for an exemplary node 700, in accordance with certain embodiments. Such local storage object attributes 702 may be stored in each node coupled to the network 108, such as nodes 102, 104, 106 of FIG. 1, and/or nodes 600, 602, 604, 606, 616*a* ... 616*n* of FIG. 6.

The local version storage object attributes local version 702 may include the original owner node identity 704, the current owner node identity 706, the transfer version 708, and the takeover type 710 (e.g., R/W, R/O, etc.) for the ownership takeover. Therefore FIG. 7, illustrates certain data structures 702, 704, 706, 708, 710 that include information that should be transferred to all nodes that are available during ownership transfer.

Figure 8:
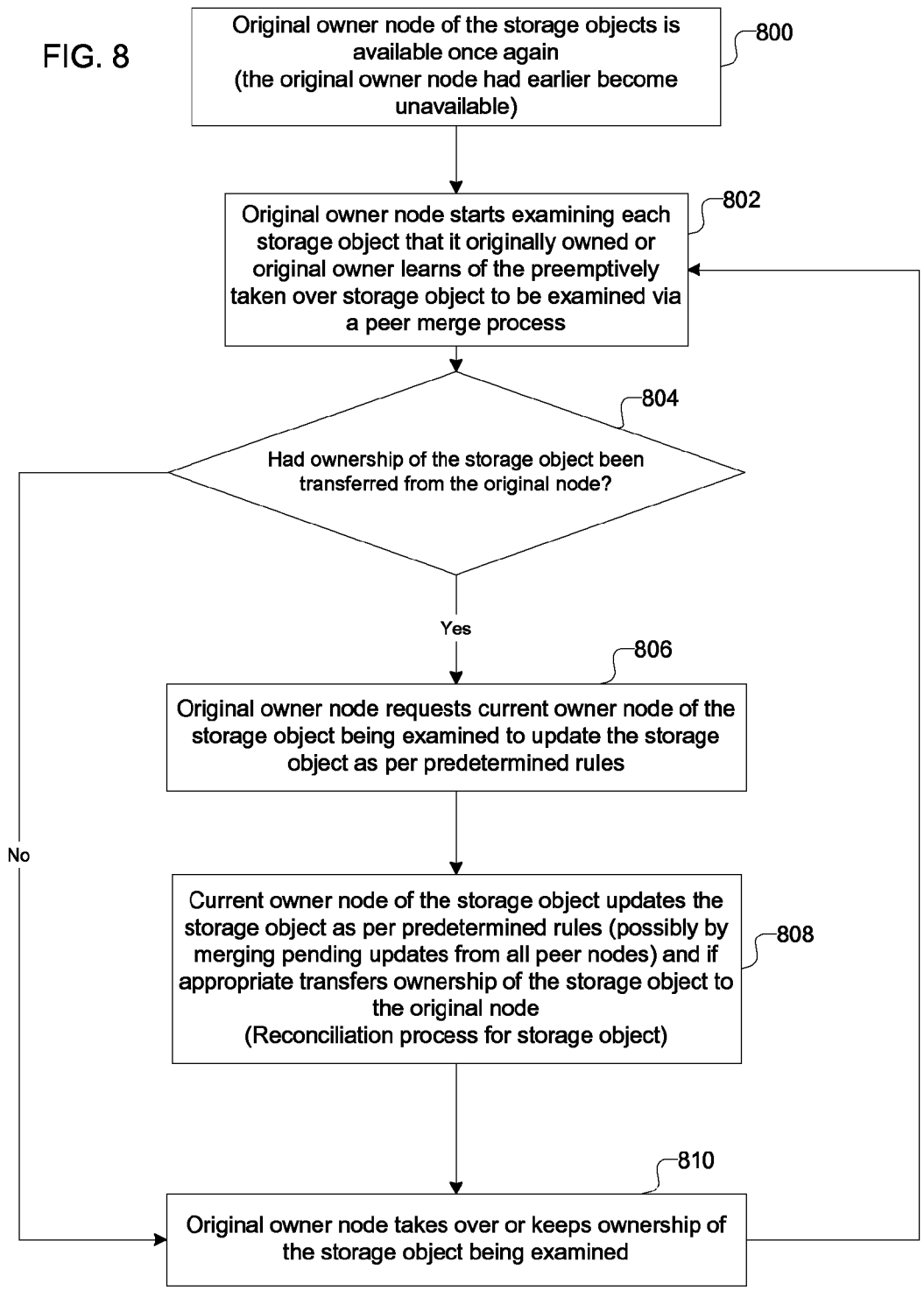
FIG. 8 illustrates third operations implemented in the computing environment, in accordance with certain embodiments.

FIG. 8 illustrates third operations implemented in the computing environment 100, in accordance with certain embodiments. The third operations may be performed by hardware, software, or firmware present on one or more of the nodes 102, 104, 106 of FIG. 1 and/or by nodes 600, 602, 604, 606, 616*a* ... 616*n* of FIG. 6.

Control starts at block 800, where the original owner node 600 (or in certain embodiments node 102) of the storage objects is available once again, wherein the original owner node 600 had earlier become unavailable. The original owner node 600 starts (at block 802) examining each storage object that the original owner node 600 originally owned or the original owner node 600 learns of the preemptively taken over storage object to be examined via a peer merge process. During the peer merge process the peers inform the original node 600 instead of the original node 600 asking all peers about all objects.

Control proceeds to block 804, where the original owner node 600 determines whether the storage object had been transferred, i.e., preemptively taken over, from the original owner node 600 while the original owner node 600 was unavailable. If so, then the original owner node 600 requests (at block 806) the current owner node of the storage object being examined to update the storage object as per predetermined rules. The current owner node of the storage object updates (at block 808) the storage object as per predetermined rules (possibly by merging pending updates from all peer nodes) and if appropriate transfers ownership of the storage object to the original node 600. This process may be referred to as the reconciliation process for storage object. Then at block 810, the original owner node 600 takes over ownership of the storage object being examined.

If at block 804, the original owner node determines whether the storage object had not been transferred from the original owner node 600 while the original owner node was unavailable then control proceeds to block 810, where the original owner node 600 keeps ownership of the storage object being examined.

Figure 9:
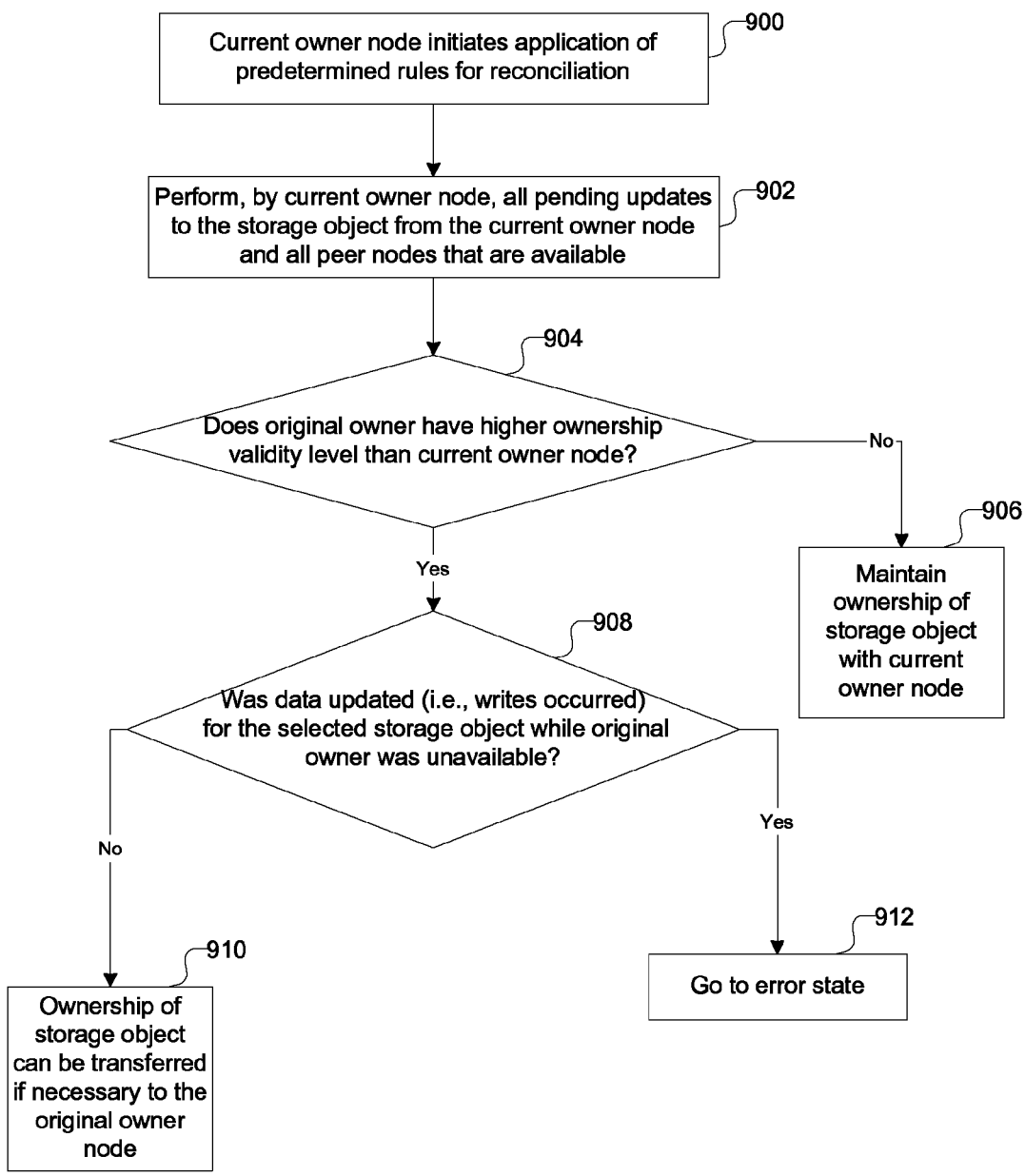
FIG. 9 illustrates fourth operations implemented in the computing environment, in accordance with certain embodiments.

FIG. 9 illustrates fourth operations implemented in the computing environment 100, in accordance with certain embodiments. The fourth operations may be performed by hardware, software, or firmware present on one or more of the nodes 102, 104, 106 of FIG. 1 and/or by nodes 600, 602, 604, 606, 616*a* ... 616*n* of FIG. 6.

Control starts at block 900, where the current owner node initiates application of predetermined rules for reconciliation. The current owner node, performs (at block 902) all pending updates to the storage object from the current owner node and all peer nodes that are available.

Control proceeds to block 904, where it is determined whether the original owner node 600 has higher ownership validity level than current owner node. If not, then ownership of the storage object is maintained (at block 906) with the current owner node.

If at block 904, it is determined that the original owner node 600 does not have a higher ownership validity than the current owner node, then control proceeds to block 908 where it is determined whether data was updated (i.e., writes occurred) for the selected storage object while original owner node 600 was unavailable. If so, then ownership of storage object can be transferred (at block 910) if necessary to the original owner node 600. If not, then the process goes to an error state because the validity of the original owner was higher but the data of the storage object was still modified by other nodes.

Therefore, FIG. 9 illustrates certain embodiments in which the operations performed during the time when the original owner node becomes available after a period of unavailability are shown. The operations allow consistency of storage objects to be maintained during a sequence of ownership transfers and data writes even when an owner node first becomes unavailable and then becomes available once again.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 10:
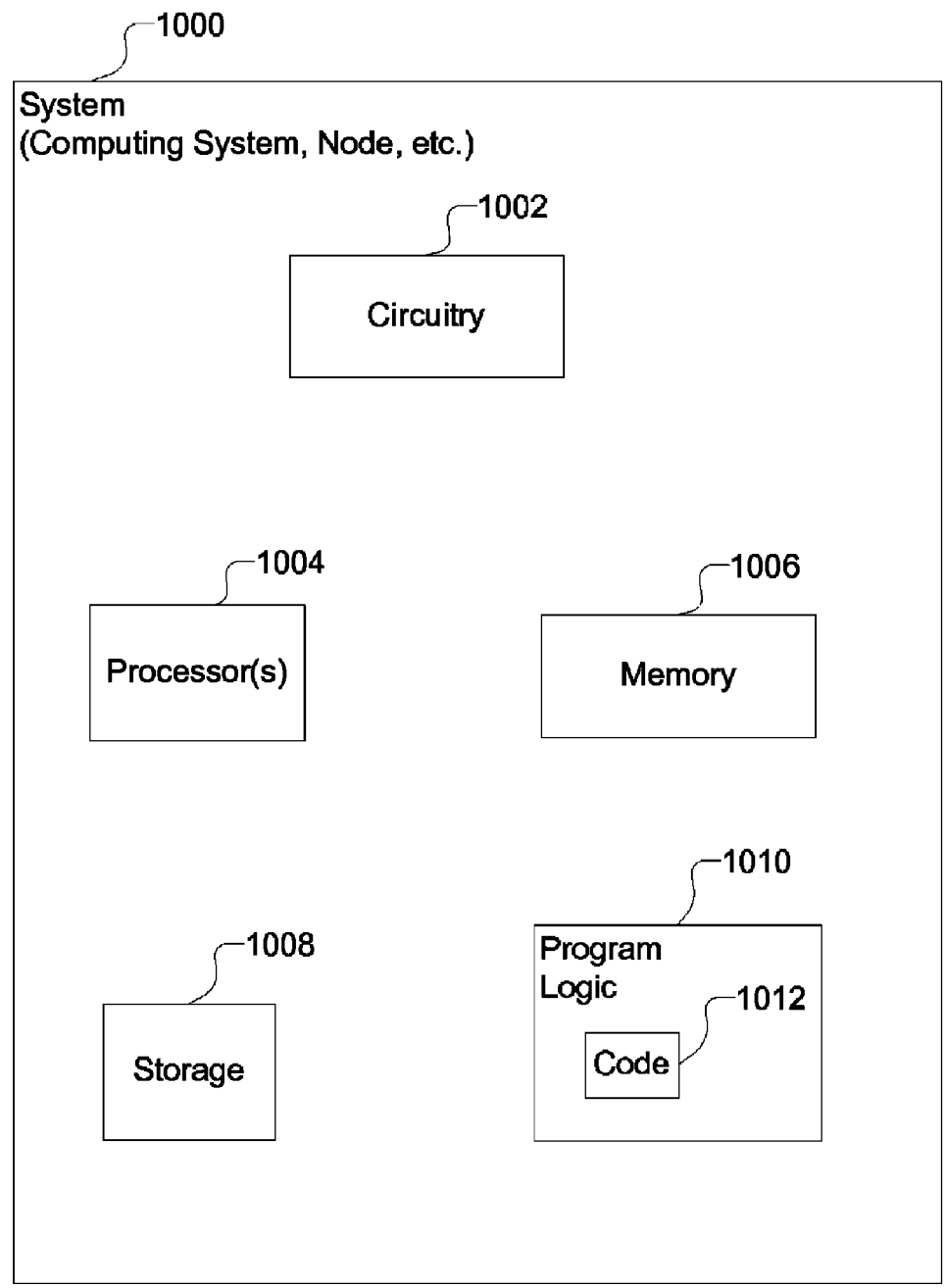
FIG. 10 illustrates a block diagram that shows certain elements that may be included in a node of the computing environment, in accordance with certain embodiments.

FIG. 10 illustrates a block diagram that shows certain elements that may be included in nodes 102, 104, 106, 600, 602, 604, 606, etc. in accordance with certain embodiments. One or more of the nodes 102, 104, 106, 600, 602, 604, 606, etc., either individually or collectively may also be referred to as a system, and may include a circuitry 1002 that may in certain embodiments include a processor 1004. The system 1000 may also include a memory 1006 (e.g., a volatile memory device), and storage 1008. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-10 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-10 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

maintaining a plurality of nodes coupled over a network, wherein a first node of the plurality of nodes initially owns a plurality of storage objects accessible via the network;

preemptively taking ownership of a selected storage object of the plurality of storage objects by a second node of the plurality of nodes, in response to the first node becoming unavailable, wherein other nodes of the plurality of nodes can request ownership of the selected storage object while the first node is unavailable;

subsequent to preemptively taking ownership of a selected storage object of the plurality of storage objects by the second node, preemptively taking ownership of the selected storage object of the plurality of storage objects by a third node of the plurality of nodes, in response to the second node becoming unavailable; and subsequent to preemptively taking ownership of the selected storage object of the plurality of storage objects by the third node, determining that the first node that originally owned the selected storage object has become available after a period of unavailability, and in response to availability of the first node after the period of unavailability, performing:

in response to determining that the first node wrote to the selected storage object prior to becoming unavailable in addition to the selected storage object being written to by the second node or the third node during the period when the first node was unavailable, then moving the selected storage object into an error state;

in response to determining that the first node wrote to the selected storage object prior to becoming unavailable and the second node and the third node read but did not write to the selected storage object during the period when the first node was unavailable and the first node has a higher ownership validity level than the third node, then returning ownership of the selected storage object to the first node; and in response to determining that the first node did not write to the selected storage object prior to becoming unavailable and the second node or the third node either read or wrote to the selected storage object during the period when the first node was unavailable, then retaining ownership of the selected storage object with the third node.

2. The method of claim 1, wherein the updating of the selected storage object further comprises:

determining, by the current owner node, whether any update is pending from a peer node on the selected storage object; and executing, by the current owner node, the pending update on the selected storage object, prior to allowing the first node to assume ownership of the selected storage object, wherein an error state can result if at least some of the pluralities of nodes modify data in the selected storage object at the same time.

3. The method of claim 1, wherein when ownership of the selected storage object is transferred to a selected node, the selected node sends the following information to all available nodes:

(i) identity of the first node that originally owned the selected storage object;

(ii) identity of the selected node that currently owns the selected storage object;

(iii) a takeover type of the selected storage object, wherein the takeover type indicates whether the selected storage object can be both read from and written to or whether the selected storage object is read only; and (iv) a transfer version that is used to validate a latest owner node in response to ownership of the selected storage object being transferred a plurality of times.

4. The method of claim 1, wherein for each node a local version of attributes of the selected storage object is maintained, and wherein the local version of the attributes of the selected storage object includes:

(i) identity of the first node that originally owned the selected storage object;

(ii) identity of the selected node that owns the selected storage object;

(iii) a takeover type of the selected storage object, wherein the takeover type indicates whether the selected storage object can be both read from and written to or whether the selected storage object is read only; and (iv) a transfer version that is used to validate a latest owner node in response to ownership of the selected storage object being transferred a plurality of times.

5. The method of claim 1, wherein:

in a Read/Write mode of ownership takeover of the selected storage object, in response to the selected storage object being taken over, existing nodes of the plurality of nodes read and write to the selected storage object; and in a Read Only mode of ownership takeover of the selected storage object, in response to the selected storage object being taken over, the existing nodes can only read the selected storage object, and any write attempt to the selected storage object fails.

6. A system, comprising:

a plurality of nodes;

a network coupling the plurality of nodes;

a memory; and a processor coupled to the memory, wherein the processor performs operations the operations comprising:

maintaining the plurality of nodes coupled over the network, wherein a first node of the plurality of nodes initially owns a plurality of storage objects accessible via the network;

preemptively taking ownership of a selected storage object of the plurality of storage objects by a second node of the plurality of nodes, in response to the first node becoming unavailable, wherein other nodes of the plurality of nodes can request ownership of the selected storage object while the first node is unavailable;

subsequent to preemptively taking ownership of a selected storage object of the plurality of storage objects by the second node, preemptively taking ownership of the selected storage object of the plurality of storage objects by a third node of the plurality of nodes, in response to the second node becoming unavailable; and subsequent to preemptively taking ownership of the selected storage object of the plurality of storage objects by the third node, determining that the first node that originally owned the selected storage object has become available after a period of unavailability, and in response to availability of the first node after the period of unavailability, performing:

in response to determining that the first node wrote to the selected storage object prior to becoming unavailable in addition to the selected storage object being written to by the second node or the third node during the period when the first node was unavailable, then moving the selected storage object into an error state;

in response to determining that the first node wrote to the selected storage object prior to becoming unavailable and the second node and the third node read but did not write to the selected storage object during the period when the first node was unavailable and the first node has a higher ownership validity level than the third node, then returning ownership of the selected storage object to the first node; and in response to determining that the first node did not write to the selected storage object prior to becoming unavailable and the second node or the third node either read or wrote to the selected storage object during the period when the first node was unavailable, then retaining ownership of the selected storage object with the third node.

7. The system of claim 6, wherein the updating of the selected storage object further comprises:

determining, by the current owner node, whether any update is pending from a peer node on the selected storage object; and executing, by the current owner node, the pending update on the selected storage object, prior to allowing the first node to assume ownership of the selected storage object, wherein an error state can result if at least some of the pluralities of nodes modify data in the selected storage object at the same time.

8. The system of claim 6, wherein when ownership of the selected storage object is transferred to a selected node, the selected node sends the following information to all available nodes:

(i) identity of the first node that originally owned the selected storage object;

(ii) identity of the selected node that currently owns the selected storage object;

(iii) a takeover type of the selected storage object, wherein the takeover type indicates whether the selected storage object can be both read from and written to or whether the selected storage object is read only; and (iv) a transfer version that is used to validate a latest owner node in response to ownership of the selected storage object being transferred a plurality of times.

9. The system of claim 6, wherein for each node a local version of attributes of the selected storage object is maintained, and wherein the local version of the attributes of the selected storage object includes:

(i) identity of the first node that originally owned the selected storage object;

(ii) identity of the selected node that owns the selected storage object;

(iii) a takeover type of the selected storage object, wherein the takeover type indicates whether the selected storage object can be both read from and written to or whether the selected storage object is read only; and (iv) a transfer version that is used to validate a latest owner node in response to ownership of the selected storage object being transferred a plurality of times.

10. The system of claim 6, wherein:

in a Read/Write mode of ownership takeover of the selected storage object, in response to the selected storage object being taken over, existing nodes of the plurality of nodes read and write to the selected storage object; and in a Read Only mode of ownership takeover of the selected storage object, in response to the selected storage object being taken over, the existing nodes can only read the selected storage object, and any write attempt to the selected storage object fails.

11. A computer readable storage medium, wherein code stored in the computer readable storage medium when executed by a processor performs operations, the operations comprising:

maintaining a plurality of nodes coupled over a network, wherein a first node of the plurality of nodes initially owns a plurality of storage objects accessible via the network;

preemptively taking ownership of a selected storage object of the plurality of storage objects by a second node of the plurality of nodes, in response to the first node becoming unavailable, wherein other nodes of the plurality of nodes can request ownership of the selected storage object while the first node is unavailable;

subsequent to preemptively taking ownership of a selected storage object of the plurality of storage objects by the second node, preemptively taking ownership of the selected storage object of the plurality of storage objects by a third node of the plurality of nodes, in response to the second node becoming unavailable; and subsequent to preemptively taking ownership of the selected storage object of the plurality of storage objects by the third node, determining that the first node that originally owned the selected storage object has become available after a period of unavailability, and in response to availability of the first node after the period of unavailability, performing:

in response to determining that the first node wrote to the selected storage object prior to becoming unavailable in addition to the selected storage object being written to by the second node or the third node during the period when the first node was unavailable, then moving the selected storage object into an error state;

in response to determining that the first node wrote to the selected storage object prior to becoming unavailable and the second node and the third node read but did not write to the selected storage object during the period when the first node was unavailable and the first node has a higher ownership validity level than the third node, then returning ownership of the selected storage object to the first node; and in response to determining that the first node did not write to the selected storage object prior to becoming unavailable and the second node or the third node either read or wrote to the selected storage object during the period when the first node was unavailable, then retaining ownership of the selected storage object with the third node.

12. The computer readable storage medium of claim 11, wherein the updating of the selected storage object further comprises:
- determining, by the current owner node, whether any update is pending from a peer node on the selected storage object; and
- executing, by the current owner node, the pending update on the selected storage object, prior to allowing the first node to assume ownership of the selected storage object, wherein an error state can result if at least some of the pluralities of nodes modify data in the selected storage object at the same time.

13. The computer readable storage medium of claim 11, wherein when ownership of the selected storage object is transferred to a selected node, the selected node sends the following information to all available nodes:
- (i) identity of the first node that originally owned the selected storage object;
- (ii) identity of the selected node that currently owns the selected storage object;
- (iii) a takeover type of the selected storage object, wherein the takeover type indicates whether the selected storage object can be both read from and written to or whether the selected storage object is read only; and
- (iv) a transfer version that is used to validate a latest owner node in response to ownership of the selected storage object being transferred a plurality of times.

14. The computer readable storage medium of claim 11, wherein for each node a local version of attributes of the selected storage object is maintained, and wherein the local version of the attributes of the selected storage object includes:
- (i) identity of the first node that originally owned the selected storage object;
- (ii) identity of the selected node that owns the selected storage object;
- (iii) a takeover type of the selected storage object, wherein the takeover type indicates whether the selected storage object can be both read from and written to or whether the selected storage object is read only; and
- (iv) a transfer version that is used to validate a latest owner node in response to ownership of the selected storage object being transferred a plurality of times.

15. The computer readable storage medium of claim 11, wherein:
- in a Read/Write mode of ownership takeover of the selected storage object, in response to the selected storage object being taken over, existing nodes of the plurality of nodes read and write to the selected storage object; and
- in a Read Only mode of ownership takeover of the selected storage object, in response to the selected storage object being taken over, the existing nodes can only read the selected storage object, and any write attempt to the selected storage object fails.

16. A method for deploying computing infrastructure, comprising integrating computer-readable code into a computing system, wherein the code in combination with the computing system is capable of performing:
- maintaining a plurality of nodes coupled over a network, wherein a first node of the plurality of nodes initially owns a plurality of storage objects accessible via the network;
- preemptively taking ownership of a selected storage object of the plurality of storage objects by a second node of the plurality of nodes, in response to the first node becoming unavailable, wherein other nodes of the plurality of nodes can request ownership of the selected storage object while the first node is unavailable;
- subsequent to preemptively taking ownership of a selected storage object of the plurality of storage objects by the second node, preemptively taking ownership of the selected storage object of the plurality of storage objects by a third node of the plurality of nodes, in response to the second node becoming unavailable; and
- subsequent to preemptively taking ownership of the selected storage object of the plurality of storage objects by the third node, determining that the first node that originally owned the selected storage object has become available after a period of unavailability, and in response to availability of the first node after the period of unavailability, performing:
  - in response to determining that the first node wrote to the selected storage object in prior to becoming unavailable addition to the selected storage object being written to by the second node or the third node during the period when the first node was unavailable, then moving the selected storage object into an error state;
  - in response to determining that the first node wrote to the selected storage object prior to becoming unavailable and the second node and the third node read but did not write to the selected storage object during the period when the first node was unavailable and the first node has a higher ownership validity level than the third node, then returning ownership of the selected storage object to the first node; and
  - in response to determining that the first node did not write to the selected storage object prior to becoming unavailable and the second node or the third node either read or wrote to the selected storage object during the period when the first node was unavailable, then retaining ownership of the selected storage object with the third node.

17. The method of claim 16, wherein the updating of the selected storage object further comprises:
- determining, by the current owner node, whether any update is pending from a peer node on the selected storage object; and
- executing, by the current owner node, the pending update on the selected storage object, prior to allowing the first node to assume ownership of the selected storage object, wherein an error state can result if at least some of the pluralities of nodes modify data in the selected storage object at the same time.

18. The method of claim 16, wherein when ownership of the selected storage object is transferred to a selected node, the selected node sends the following information to all available nodes:
- (i) identity of the first node that originally owned the selected storage object;
- (ii) identity of the selected node that currently owns the selected storage object;
- (iii) a takeover type of the selected storage object, wherein the takeover type indicates whether the selected storage object can be both read from and written to or whether the selected storage object is read only; and
- (iv) a transfer version that is used to validate a latest owner node in response to ownership of the selected storage object being transferred a plurality of times.

19. The method of claim 16, wherein for each node a local version of attributes of the selected storage object is maintained, and wherein the local version of the attributes of the selected storage object includes:
  (i) identity of the first node that originally owned the selected storage object;
  (ii) identity of the selected node that owns the selected storage object;
  (iii) a takeover type of the selected storage object, wherein the takeover type indicates whether the selected storage object can be both read from and written to or whether the selected storage object is read only; and
  (iv) a transfer version that is used to validate a latest owner node in response to ownership of the selected storage object being transferred a plurality of times.

20. The method for deploying computing infrastructure of claim 16, wherein:
  in a Read/Write mode of ownership takeover of the selected storage object, in response to the selected storage object being taken over, existing nodes of the plurality of nodes read and write to the selected storage object; and
  in a Read Only mode of ownership takeover of the selected storage object, in response to the selected storage object being taken over, the existing nodes can only read the selected storage object, and any write attempt to the selected storage object fails.

* * * * *